United States Patent
Naish et al.

(10) Patent No.: US 7,523,206 B1
(45) Date of Patent: Apr. 21, 2009

(54) METHOD AND SYSTEM TO DYNAMICALLY APPLY ACCESS RULES TO A SHARED RESOURCE

(75) Inventors: Martin R. Naish, Newbury (GB); Richard M. Bicheno, Havant (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,925

(22) Filed: Apr. 7, 2008

(51) Int. Cl.
*G06F 15/16* (2006.01)
*G06F 15/173* (2006.01)

(52) U.S. Cl. .................. 709/226; 709/223; 709/224; 709/229

(58) Field of Classification Search ................. 709/223, 709/224, 226, 229; 718/103, 104; 370/229, 370/352
See application file for complete search history.

(56) References Cited

U.S. PATENT DOCUMENTS

| | | | |
|---|---|---|---|
| 5,596,576 A | 1/1997 | Milito | |
| 6,067,557 A * | 5/2000 | Hegde | 718/103 |
| 6,671,724 B1 * | 12/2003 | Pandya et al. | 709/226 |
| 6,771,595 B1 * | 8/2004 | Gilbert et al. | 370/229 |
| 6,839,850 B1 | 1/2005 | Campbell et al. | |
| 7,032,222 B1 | 4/2006 | Karp et al. | |
| 7,113,987 B2 | 9/2006 | Nabkel et al. | |
| 7,243,171 B2 | 7/2007 | Doshi et al. | |
| 7,290,056 B1 | 10/2007 | McLaughlin, Jr. | |
| 7,340,513 B2 | 3/2008 | Donatelli et al. | |
| 2002/0059427 A1 | 5/2002 | Tamaki et al. | |
| 2002/0083166 A1 * | 6/2002 | Dugan et al. | 709/223 |
| 2002/0147801 A1 * | 10/2002 | Gullotta et al. | 709/223 |
| 2004/0153545 A1 * | 8/2004 | Pandya et al. | 709/226 |
| 2004/0205781 A1 | 10/2004 | Hill et al. | |
| 2005/0060409 A1 * | 3/2005 | Dube et al. | 709/226 |
| 2005/0081075 A1 | 4/2005 | Kocev et al. | |
| 2005/0144246 A1 | 6/2005 | Malik | |
| 2005/0165938 A1 | 7/2005 | Cornett | |
| 2006/0085530 A1 * | 4/2006 | Garrett | 709/223 |
| 2006/0109857 A1 | 5/2006 | Herrmann | |
| 2006/0195576 A1 * | 8/2006 | Rinne et al. | 709/226 |
| 2006/0221934 A1 * | 10/2006 | Cooke et al. | 370/352 |
| 2006/0224740 A1 * | 10/2006 | Sievers-Tostes et al. | 709/226 |
| 2008/0229319 A1 * | 9/2008 | Marchand | 718/104 |

OTHER PUBLICATIONS

Ali Raza Butt, et al., Fine-Grain Access Control for Securing Shared Resources in Computational Grids, Proceedings of the International Parallel and Distributed Processing Symposium, 2002, pp. 1-8, IEEE Computer Society.

* cited by examiner

*Primary Examiner*—Quang N. Nguyen
(74) *Attorney, Agent, or Firm*—Suiter Swantz pc llo

(57) ABSTRACT

A method for dynamic application of access rules to a shared resource may comprise: a) receiving a client request for access to a shared system resource; b) logging information associated with the client request for access to the shared system resource; c) receiving system status data; d) defining a shared system resource allocation rule; e) allocating client access to the shared system resource according to the logged information associated with the client request for access to the shared system resource, the system status data, and the shared system resource allocation rule; and f) queuing a control instruction regulating client access to the shared system resource.

5 Claims, 2 Drawing Sheets

METHOD AND SYSTEM TO DYNAMICALLY APPLY ACCESS RULES TO A SHARED RESOURCE

BACKGROUND

In queue based messaging system throughput of messages can be variable. In some cases after a system recovery or at peak processing times it is possible for very large volumes of data to be sent at once and for messaging endpoints/queues to become flooded. Sometimes this may result in queues overflowing and even lost messages. This scenario could also occur as part of a denial of service attack on a messaging system. In messaging application programming interfaces (API) such as Java Message Service (JMS) there is no dynamic mechanism for throttling load or number of connections to a resource such as a queue to ensure it is not overwhelmed. One example of this is where store and forward processing is used. If the endpoint which is sent messages goes down, then the messages being stored can grow to a large number. Accordingly, when the endpoint recovers, a very large and sudden burst of messages will be sent to the endpoint for processing.

SUMMARY

A method for dynamic application of access rules to a shared resource may comprise: a) receiving a client request for access to a shared system resource; b) logging information associated with the client request for access to the shared system resource; c) receiving system status data; d) defining a shared system resource allocation rule; e) allocating client access to the shared system resource according to the logged information associated with the client request for access to the shared system resource, the system status data, and the shared system resource allocation rule; and f) queuing a control instruction regulating client access to the shared system resource.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
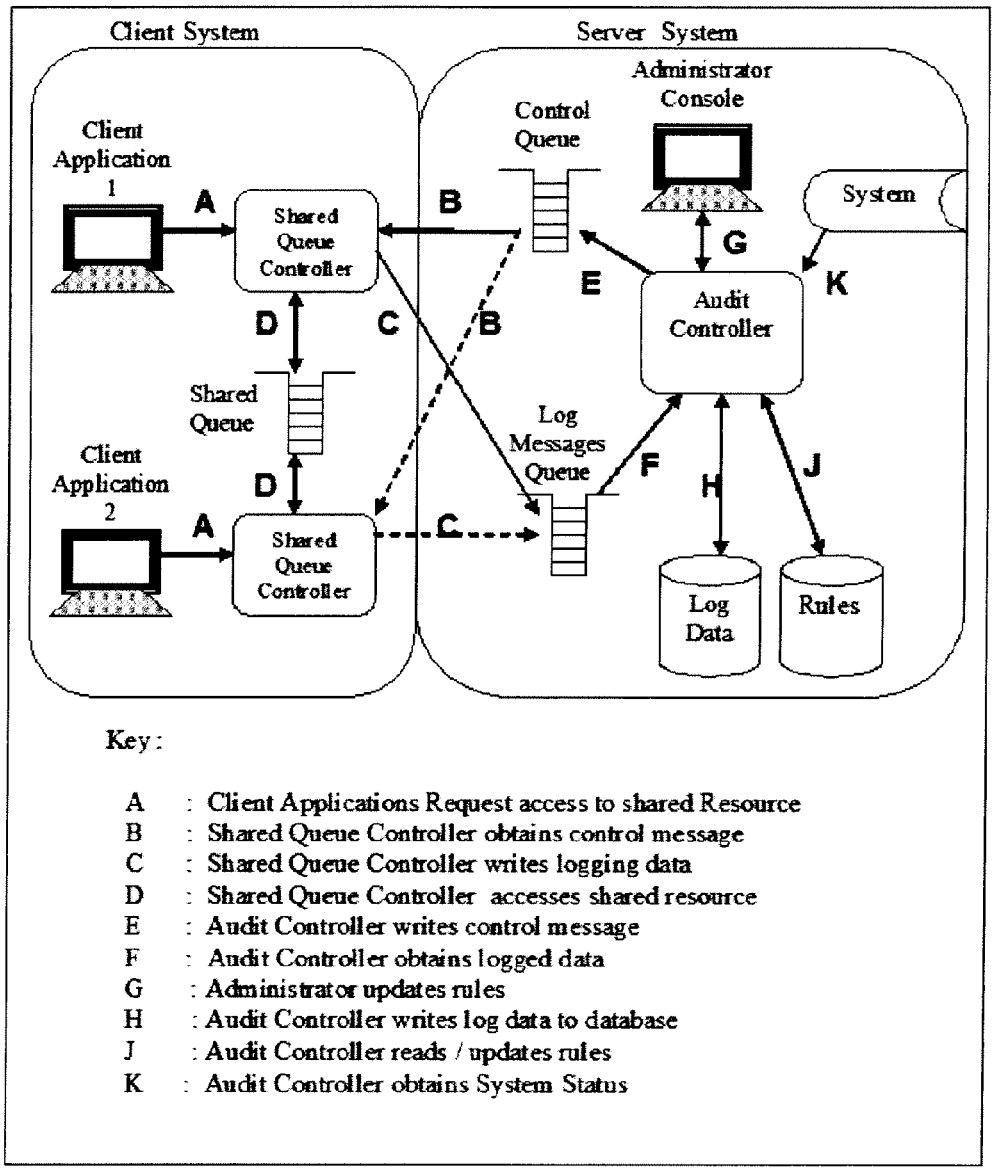
FIG. 1 is a flow diagram view illustrating the Audit Controller in operation with Shared Queue Controller(s)

Referring to FIG. 1, a system for applying access rules for a shared resource may include at least one Client Application, at least one Shared Queue Controller (SQC), and an Audit Controller.

A Client Application may be a messaging application used to send/receive data to a Shared Queue associated with a shared resource that one or more Client Applications may access to perform a business operation. Client Applications may provide a request to an SQC to obtain access to and use the shared resource.

The SQC may control access by the Client Applications to a Shared Queue. The SQC may use data on a Control Queue to determine if access is permitted to a given Client Application or if there are any restrictions on access (e.g. restriction to a certain rate or number of messages). The Control Queue may hold control messages from the Audit Controller which may used to influence the behavior of the SQC and, by proxy, the Client Application. All sends/receives between a Client Application and the Shared Queue may be transmitted via the SQC interface allowing for pacing of the sends/receives, if needed, according to various Rules through the use of waits or sleeps.

Referring again to FIG. 1, the Audit Controller may receive inputs of system events from multiple resources and apply Rules to these events.

For example, various System applications may monitor system status data regarding various aspects of the system (e.g. CPU performance, memory allocation, queue depth, etc.).

Similarly, the SQC may provide log data to the Audit Controller via a Log Messages Queue. The Log Message Queue may be used by the SQC to record an access request by a Client Application for a shared resource in order to inform the Audit Controller of what operations a Client Application has been conducting on a shared resource. The SQC may log data such as the number of messages sent/received by the Client Application to the Log Messages Queue. This logging may be batched and transmitted either at fixed times or after a set number of messages so as to keep the impact of logging to a minimum.

The Audit Controller may receive data regarding various system events (e.g. Client Application requests for access to the Shared Queue) from the System Monitoring Applications, the Log Messages Queue, and the like, and apply various Rules according to these events. For example, a rule may require that queue depth be maintained at less than 1000 or use of a System CPU should not exceed 80%. These Rules may be stored in a Rules database and may be monitored and enforced by the Audit controller.

Based on the outcome of the application of a Rule to a system event, the Audit Controller may control a Client Application's behavior by placing Control Messages on the Control Queue which may be received by a SQC which may, in turn, modify Client Application function accordingly.

In another example, a Rule may be defined such that access to the resource by may be restricted based on client user ID or hostname of a Client Application (e.g. a clientsAllowed field in a Control Message). The SQC may determine if its name is in the clientsAllowed property of a Control Queue message from the Audit Controller to see if it is allowed access to the resource.

In still another example, a Rule may be defined to check the depth of the Shared Queue for the shared resource and, upon reaching a given number of pending access requests, the Audit Controller may restrict the number clients permitted access to the resource, thereby throttling access to the queue during busy periods.

In still another example, a Rule may be defined to so that each Client may be allocated a particular time slot in which to access the resource.

In still another example, the Auditor Controller may monitor the Log Messages Queue to see how many messages each client is sending. A Rule governing a threshold number of log messages that may be sent per day for each client may be defined. The Audit Controller may detect when the threshold for a given Client has been passed and restrict that Client from sending/receiving messages by removing that client's identification from a clientsAllowed field on the Rules message in the Control Queue.

Referring again to FIG. 1, the Server System may include an Administration Console which may allow for the modification of the Audit Controller to include new Rules or provide access to existing logged data.

Referring again to FIG. 1, the Audit Controller may archive Log Messages data or System Status data information to a Log Data database.

Figure 2:
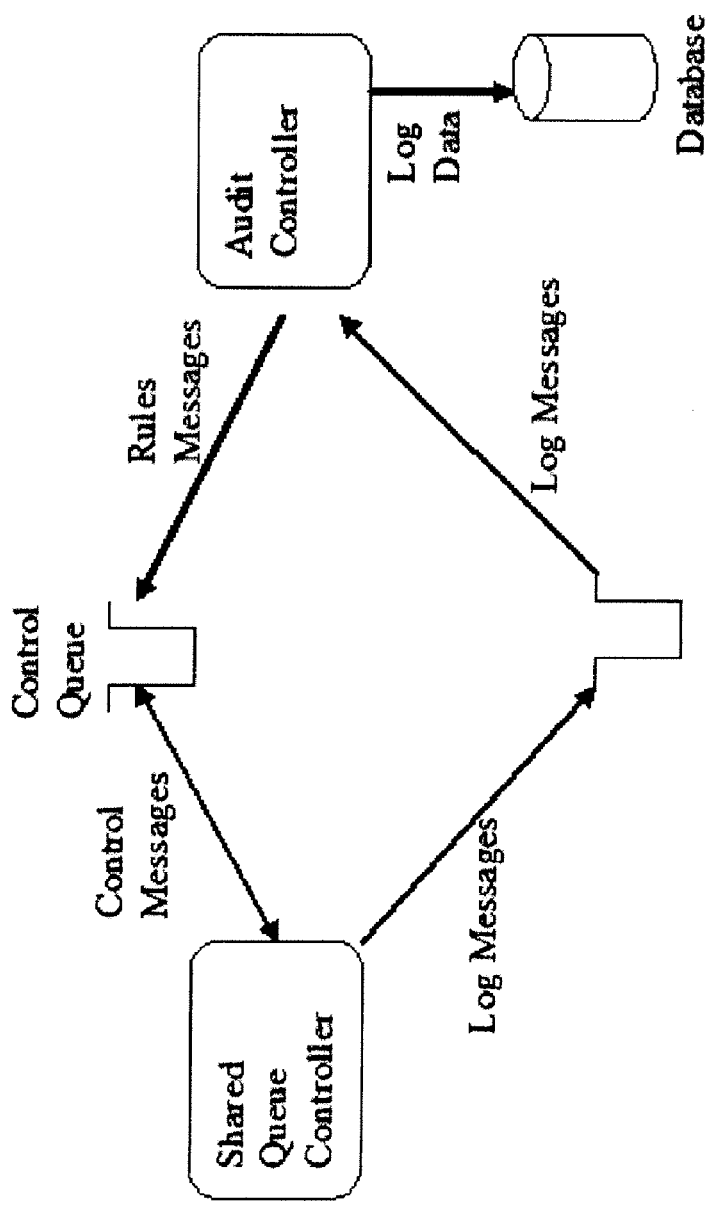
FIG. 2 is a flow diagram illustrating the interaction of the Client System with the Server System.

Referring to FIG. 2, a process flow diagram representing an exemplary embodiment of a method is presented.

A shared resource access Rule may be defined and stored in a Database (e.g. a maximum access request rate for a particular Client Application; a Shared Queue depth, etc.)

When a SQC receives a shared resource access request, the SQC may log a message to the Log Message Queue stating what the client has done to the shared resource (e.g. has sent 100 messages). This data may be logged by the Audit Controller to a Log Data Database.

A Shared Queue Controller may receive subsequent requests from a Client Application (not shown) to access a shared resource. It may be the case that the Client Application is sending data too quickly, thereby flooding the Shared Queue. The Shared Queue may reaches a threshold depth (e.g. 1000 messages). This is detected by a System monitoring program which may provide the Shared Queue depth data to the Audit Controller.

The Audit Controller may check this information against the Defined Rules and determine that a Shared Queue depth rule (e.g. that a queue depth of 1000 messages should not be exceeded) and determine it needs to slow access to the resource by at least one Client Application.

The Audit Controller may examine the Log Database to see which Client Application(s) have been sending the most messages and place a Control Message in the Control Queue with a notice to inform one or more Client Application clients to slow their access requests. The SQCs for those Client Applications may see the Control Message an slow the rate at which the they are sending requests.

The audit controller may continue to check the queue depth and can slow the rate further if required or speed it up when the queue depth returns to an acceptable level.

This illustrates how this system can dynamically change the behavior of the clients based on feedback from different components in the system. The rules could of course also be changed at any time to influence the behavior of the messaging system. Note that there will be no code changes to client are required to regulate the shared resource access, so long as the Client Applications write to the SQC interface.

There may be some latency/lag between the occurrence of an event (e.g. the Shared Queue reaching 1000 messages) and the clients being slowed via the SQC. The size of this latency in the feedback mechanism can be tuned by allowing the clients SQC to log more frequently and to poll for control messages more often. So there is a trade off to be made between latency in the feedback cycle and the performance impact of the logging and polling on normal messaging operations.

EXAMPLE

Two clients may be allowed access to a resource during a restricted-use time period, but ten clients may be allowed access to the resource outside of the restricted-use period.

At the beginning of the restricted-use time period, the audit controller may insert a Rules message in the Control Queue have a token id unique to a resource. The Rules messages may be a non-expiring message that all connected Clients Applications may browse. This message may have a property of "number of connections" set to two.

Subsequently, additional Client Applications may request access to the shared resource via their SQC by placing control messages on the Control Queue with the same unique token id for the resource.

Each SQC may see that there is an existing Rules message on the Control Queue for that resource stating only two clients may connect at any one time. Each SQC may then update its own control message with this setting. Each SQC may compare the timestamp of its control message to the control messages of the remaining SQCs in the control queue determine if it has one of the two oldest timestamps for that resource, thereby entitling it to access to the resource.

The two authorized clients may maintain their exclusive access to the resource until they fail, disconnect, or the restricted-use time period expires. As such, eight clients will be blocked. At the end of the restricted-use time period, the Audit Controller may adjust the number or authorized clients according to a second Rule. The Auditor may modify the Rules message on the Control Queue by changing the number-of-connections property to ten.

Each SQC may poll the Rules messages for its associated resource for changes to the properties and may detect the change in the number of connections to ten. Each SQC may updates its own control message to indicate reflect the change and may assesses if its Client Application is one of the Client Applications whose control message has one of the ten oldest timestamps by browsing all messages on the Control Queue with the same token id for that resource and comparing the timestamps. If its client is one of the ten oldest then the SQC allows the Client Application access to the resource.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:
1. A method comprising:
  receiving a client request for access to a shared system resource;
  logging information associated with the client request for access to the shared system resource;

receiving system status data;

defining a shared system resource allocation rule;

allocating client access to the shared system resource according to the logged information associated with the client request for access to the shared system resource, the system status data, and the shared system resource allocation rule; and queuing a control instruction regulating client access to the shared system resource;

wherein the defining a shared system resource allocation rule comprises defining a queue depth for the client requests for access to the shared system resource, defining access time intervals for a client, and defining a number of allowed log entries associated with the client request for access to the shared system resource.

2. The method of claim 1, further comprising:

archiving at least one of the log entry or system status data.

3. The method of claim 1, further comprising:

modifying the shared system resource allocation rule.

4. The method of claim 1, wherein the defining a shared system resource allocation rule comprises:

defining a number of authorized clients.

5. The method of claim 1, wherein the defining a shared system resource allocation rule comprises:

defining a list of authorized clients.

* * * * *